March 12, 1935.  E. G. RIX ET AL  1,993,807
CONVEYING AND DELIVERING MECHANISM
Filed Dec. 6, 1932  3 Sheets-Sheet 1

INVENTORS
Edward G. Rix & Walker H. Lyman
Jones, Addington, Ames & Seibold
ATTYS March 12, 1935.  E. G. RIX ET AL  1,993,807
CONVEYING AND DELIVERING MECHANISM
Filed Dec. 6, 1932  3 Sheets-Sheet 3
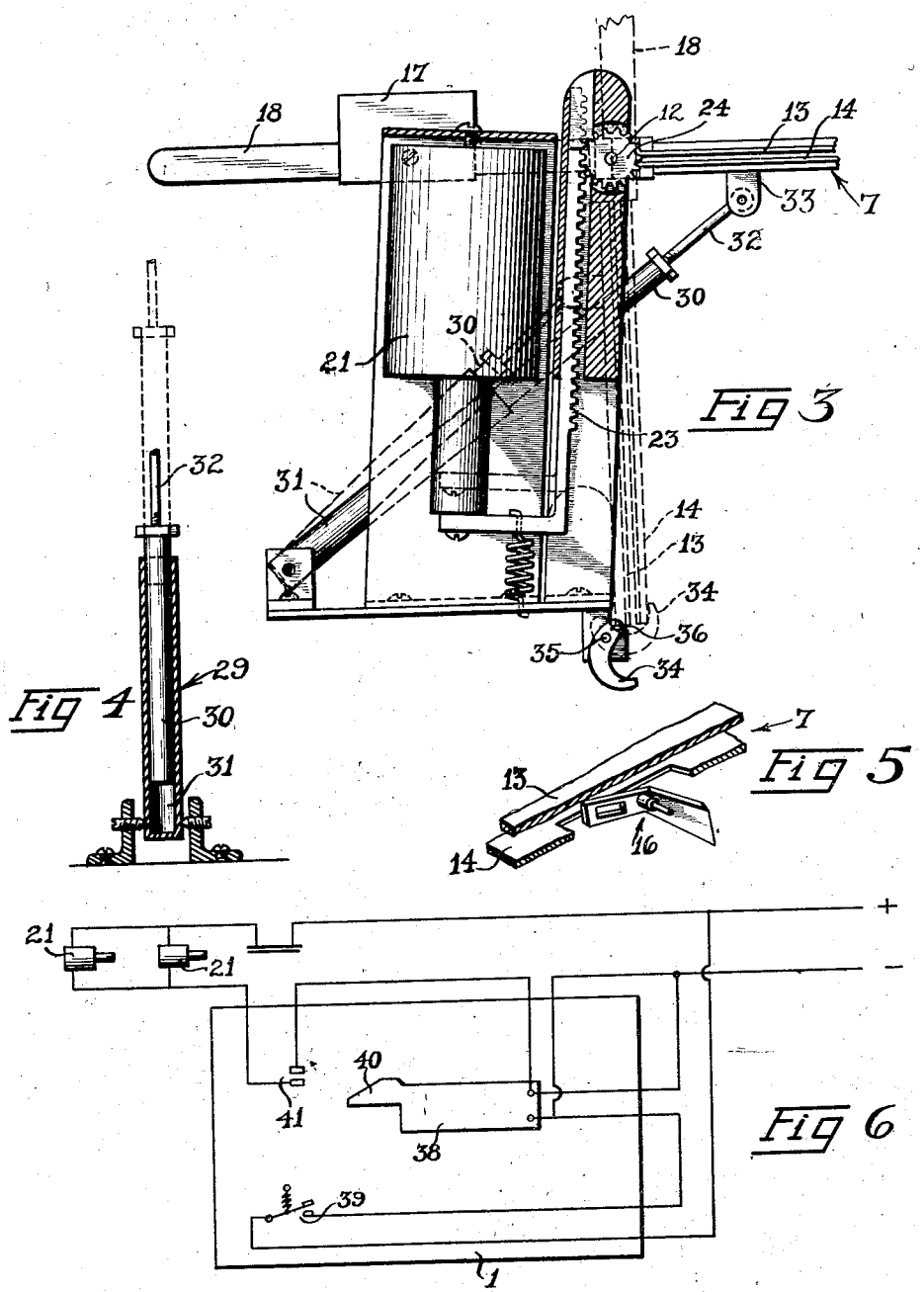
INVENTORS
Edward G. Rix & Walter A. Lyman
Jones, Addington, Ames & Seibold
ATTYS Patented Mar. 12, 1935

1,993,807

UNITED STATES PATENT OFFICE 1,993,807

CONVEYING AND DELIVERING MECHANISM

Edward G. Rix and Walter H. Lyman, Chicago, Ill., assignors to The International Check Endorser Co., Chicago, Ill.

Application December 6, 1932, Serial No. 645,940

5 Claims. (Cl. 271—70)

Our invention relates to a conveying and delivering mechanism and more particularly to a conveying and delivering mechanism for conveying a paper check or similar article of paper or other material from a bookkeeping machine and delivering the check to a machine for endorsing it.

Up to the present time, in instances in which large numbers of checks were handled, the checks would be filled in on a bookkeeping machine or typewriter and then placed in an automatic mechanical endorser for signature. With our invention, however, as the check, during the normal operation of the bookkeeping machine, leaves the machine and enters the conveying and delivering mechanism herein described, which delivers it to the endorsing machine for endorsement, the entire operation is automatic and consummated without attention from the bookkeeping machine operator.

An object of our invention is to provide a means between a bookkeeping machine and a check-endorsing machine for receiving checks from the bookkeeping machine for conveying them to and for delivering them into the check endorser.

Another object of our invention is to reduce the amount of labor involved in the writing and endorsing of checks or similar papers handled in large numbers.

Further objects and advantages will be apparent from the description and claims.

In the drawings,

Fig. 3 is a cross-sectional view taken on the plane 3—3 of Fig. 1;

Fig. 4 is a detailed view of a part of our invention;

Fig. 5 is a detailed view taken on the plane 5—5 of Fig. 1; and

Fig. 6 is a wiring diagram of the circuit involved in our invention.

Figure 1:
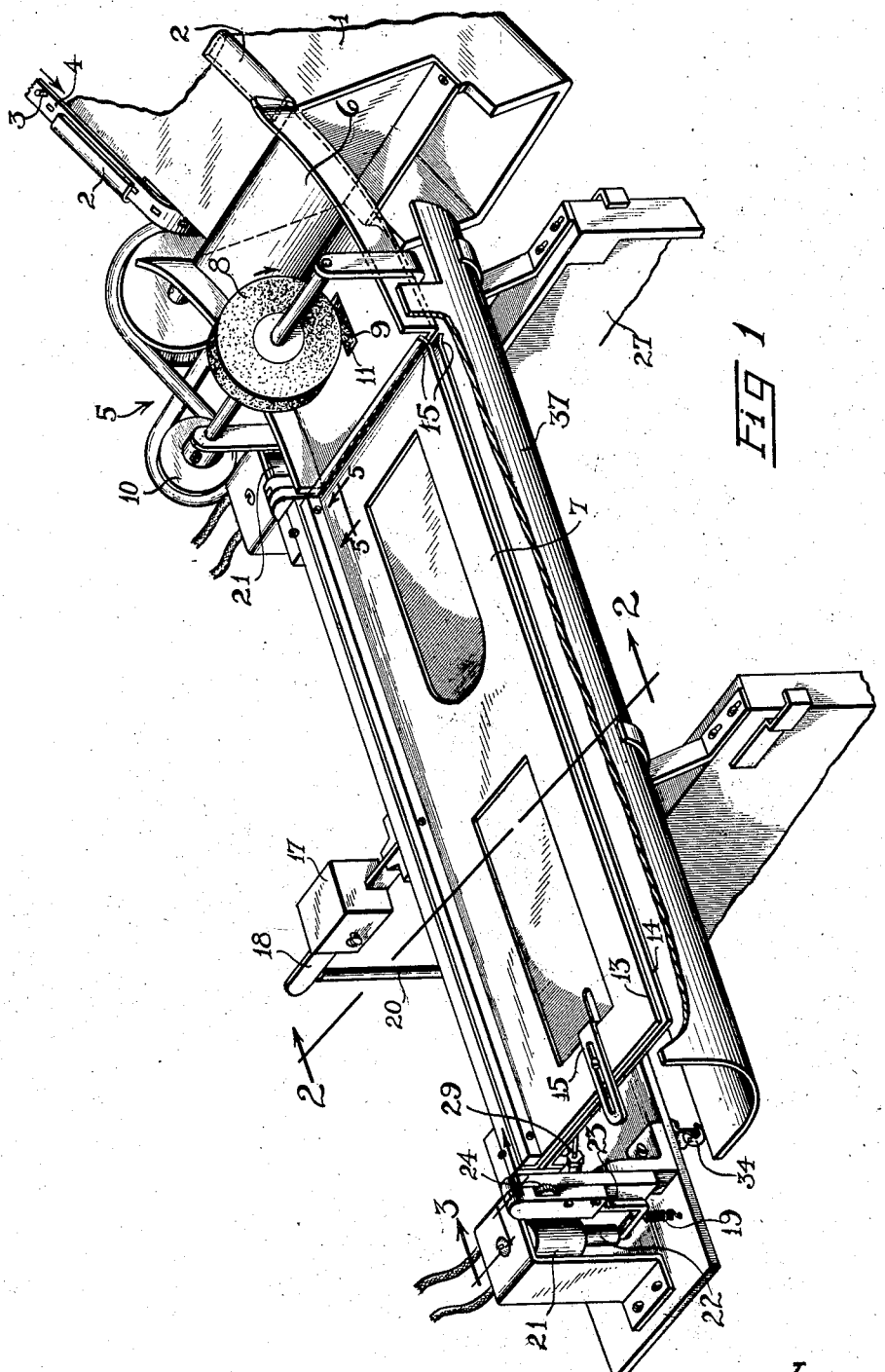
Figure 1 is a perspective view of the device attached to a bookkeeping machine.

Referring further to the drawings, Fig. 1 shows a portion of a bookkeeping machine 1, having guides 2, through which checks are conveyed by contacting with studs 3 spaced along the inner edge of a continuous conveyor belt 4 traveling, as shown by the arrow, into the conveying and delivering mechanism 5.

An inclined channel-shaped chute 6 is fastened to the bookkeeping machine 1 to guide the checks into a holder 7. A pair of resilient feeding rollers 8 and 9, operated by a pulley 10, are mounted on the chute 6 having an opening 11 to afford contact between the rollers and traction to the checks as they pass therebetween and thence into the holder 7.

The holder 7, pivotally mounted at 12, comprises two sheets of metal 13 and 14, positioned in spaced parallel relation with respect to each other, having flares 15 at one end to admit of ready ingress of the checks to the holder as they are delivered by the rollers 8 and 9, an adjustable bumper 15, and a check mechanism 16 which allows ingress of the checks but does not permit them to leave the holder should they rebound after striking the bumper 15.

An adjustable weight 17 is fixed on an arm 18 attached to the holder 7 and functions in collaboration with the spring 19 in returning the pivotally mounted holder 7 to the position shown in Fig. 1.

The stop 20 is positioned to abut the arm 18 when the holder returns to the position to receive another check from the bookkeeping machine, as shown in Fig. 1.

Figure 2:
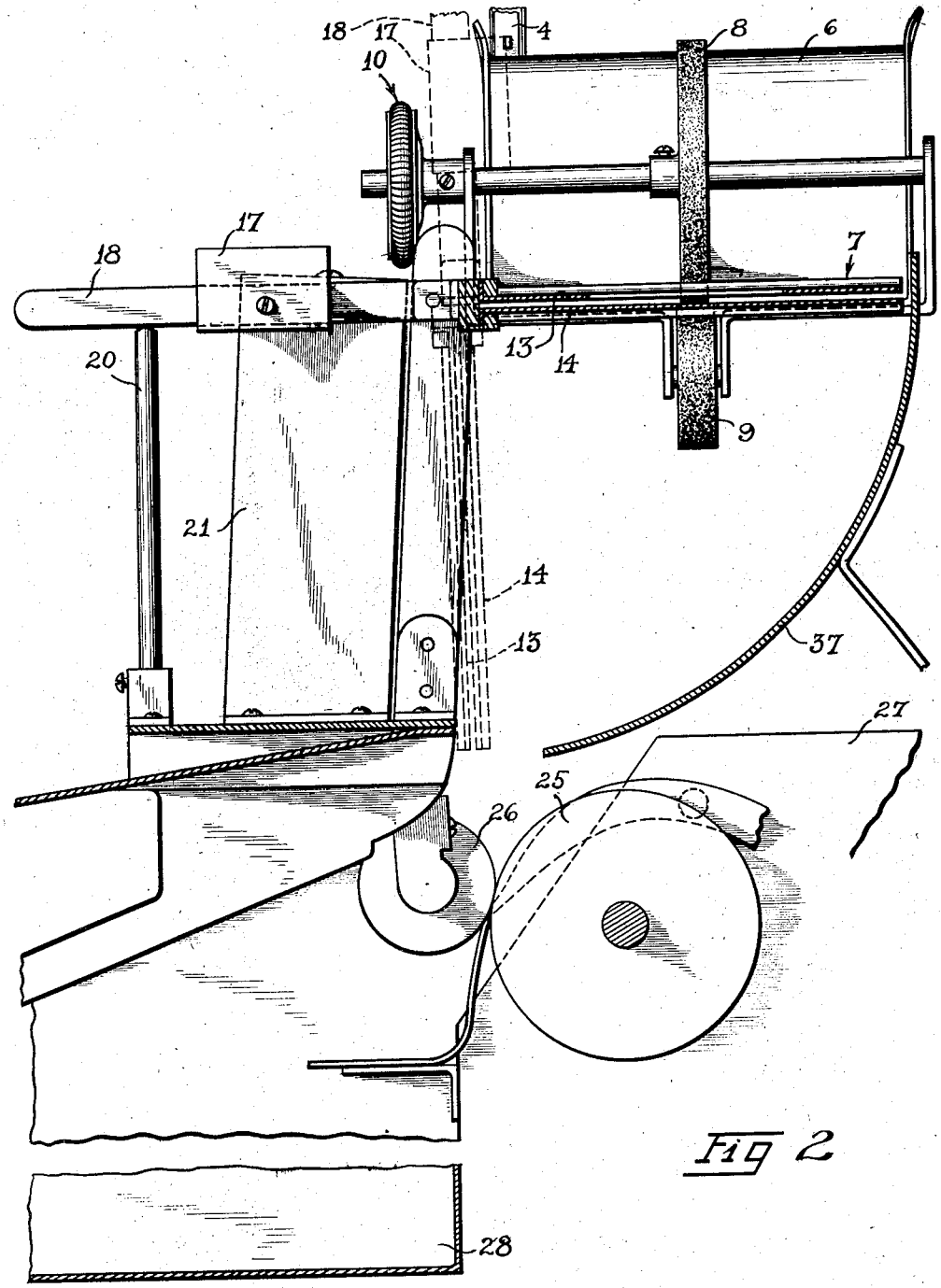
Fig. 2 is a cross-sectional view of our invention taken through the plane 2—2 of Fig. 1.

The two solenoids 21 are timed to become energized when a check has completely entered the holder 7, at which time the solenoid pistons 22 are raised, pulling therewith a rack 23 meshed with a pinion gear 24 fixedly attached to the holder 7. Obviously, the holder is swung down into the position shown in dotted lines in Fig. 2, thereby depositing the check between the rollers 25 and 26 of the check endorser 27 for endorsing, whence the check is deposited into a receptacle 28.

A dash-pot 29 for cushioning the action of the holder comprises a piston 30 having a sliding fit with respect to a cylinder 31 pivotally mounted near its base, and has screwed into its upper end a rod 32 pivotally fastened to a U-support 33 located on the underside of the holder 7.

A rocker arm detent 34, shown in Figs. 1 and 3, is provided which is pivotally mounted at 35 and has an abutment 36 in the path of the outer edge of the holder 7. The abutment, when struck by the holder 7 on its downward stroke, is forced into the position shown in dotted lines, thereby gripping the holder momentarily—until the detent drops of its own weight—and allows sufficient time for the paper check to drop from the holder into the check endorser 27 before the holder starts returning to the position shown in Fig. 1.

A curved retainer 37, to protect the holder and to keep the paper check from dropping before it is directly above the endorsing rollers 25 and 26, is shaped to conform to the radial path of the outer edge of the holder.

In the circuit diagram shown in Fig. 6, the tabulator key of the bookkeeping machine 1 closes a switch 39, setting in motion the bookkeeping machine's movable carriage 38 until a cam 40 on the carriage closes a switch 41 which energizes the two solenoids 21 and supplies current to the carriage although the tabulator key switch 39 returns to its open position. As the carriage continues its movement, switch 41 opens as it drops upon the lower part 42 of the carriage 38, cutting off the current from both the solenoids 21 and the carriage 38. Returning the carriage to its starting position is a manual operation.

Further modifications will be apparent to those skilled in the art and it is desired, therefore, that our invention be limited only by the prior art and the scope of the appended claims.

Having thus described our invention, what we claim and desire to secure by Letters Patent is:

1. The combination with a printing couple including a pair of rollers having substantially horizontal parallel axes, of means for delivering slips to said printing couple, comprising means for advancing a slip by movement longitudinally of the axes of said rollers from a position substantially outside of the space between parallel planes through the ends of the rollers perpendicular to their axes to the space between said planes, and thereafter swinging the slip about an axis substantially parallel to the axes of said rollers into a plane substantially tangential to both rollers at their line of contact.

2. The combination with a printing couple including a pair of rollers having substantially horizontal parallel axes, of means for delivering slips to said printing couple, comprising means for advancing a slip by movement longitudinally of the axes of said rollers from a position substantially outside of the space between parallel planes through the ends of the rollers perpendicular to their axes to the space between said planes, and thereafter swinging the slip about an axis substantially parallel to the axes of said rollers into a plane substantially tangential to both rollers at their line of contact, said swinging means comprising a swinging slip receiver and electromagnetic means for actuating it.

3. The combination with a printing couple including a pair of rollers having substantially horizontal parallel axes, of means for delivering slips to said printing couple, comprising means for advancing a slip by movement longitudinally of the axes of said rollers from a position substantially outside of the space between parallel planes through the ends of the rollers perpendicular to their axes to the space between said planes, and thereafter swinging the slip about an axis substantially parallel to the axes of said rollers into a plane substantially tangential to both rollers at their line of contact, said swinging means comprising a swinging slip receiver and said advancing means comprising slip feeding means adjacent the entrance to said swinging slip receiver.

4. The combination with a printing couple including a pair of rollers having substantially horizontal parallel axes, of means for delivering slips to said printing couple, comprising means for advancing a slip by movement longitudinally of the axes of said rollers from a position substantially outside of the space between parallel planes through the ends of the rollers perpendicular to their axes to the space between said planes, and thereafter swinging the slip about an axis substantially parallel to the axes of said rollers into a plane substantially tangential to both rollers at their line of contact, said swinging means comprising a swinging slip receiver and said advancing means comprising a slip feeding wheel adjacent the entrance to said swinging slip receiver.

5. The combination with a printing couple including a pair of rollers having substantially horizontal parallel axes, of means for delivering slips to said printing couple, comprising means for advancing a slip by movement longitudinally of the axes of said rollers from a position substantially outside of the space between parallel planes through the ends of the rollers perpendicular to their axes to the space between said planes, and thereafter swinging the slip about an axis substantially parallel to the axes of said rollers into a plane substantially tangential to both rollers at their line of contact, said swinging means comprising a swinging slip receiver and electromagnetic means for actuating it, and slip-controlled means for controlling said electromagnetic means.

EDWARD G. RIX.
WALTER H. LYMAN.